Oct. 22, 1963     G. E. HEINEMANN     3,107,706
SAW BLADE
Filed Aug. 12, 1960

INVENTOR.
GEORGE E. HEINEMANN
BY John D. Haney
ATTY.

3,107,706
SAW BLADE
George E. Heinemann, Canton, Ohio, assignor to Heinemann Saw Corporation, Canton, Ohio, a corporation of Ohio
Filed Aug. 12, 1960, Ser. No. 49,209
10 Claims. (Cl. 143—137)

This invention relates to saw blades and more especially to saws of circular shape adapted for high speed rotation. According to this invention a saw is provided which is capable of running at the service-required speeds (e.g. as much as 5000 revolutions per minute) without emitting the objectionable whine or howling noise which has been characteristic of saws known in prior art. The running noise or whine we refer to herein is that sound of high pitch and intensity emitted by a saw blade while running in air, prior to its entry into a kerf.

In our studies of the phenomenon of saw blade whine, we have observed that this objectionable noise is characteristic of even the most skillfully made and accurately tensioned saw blades. With such high quality blades, the pitch and intensity of the noise appears to be closely related to the configuration of the saw teeth, the interaction of the saw teeth and the air apparently inducing noise-emitting vibrations in the saw blade. For example, we have observed that a saw blade which whines and howls most objectionably when run at regular speed in its normal cutting direction, will operate without appreciable noise when run at the same speed but with the blade rotation reversed. Since the tooth configuration is usually dictated by the service requirements for the saw, it is not feasible to attempt to minimize noise by altering the teeth structure.

We have discovered that a saw made as described herein, operates so that such running noise is practically eliminated, or at least reduced to a level in which it is not objectionable. This desirable result has been accomplished, moreover, in a manner which does not weaken or impair the structural integrity of the saw blade, or in any way limit its service usefulness. And saws made according to this invention make exceptionally smooth kerfs, and they may be resharpened by conventional techniques. In addition to the elimination of objectionable noise, another beneficial result provided by the invention is the elimination of cracks in the saw blades in the regions adjoining the root portion of the teeth.

Figure 1:
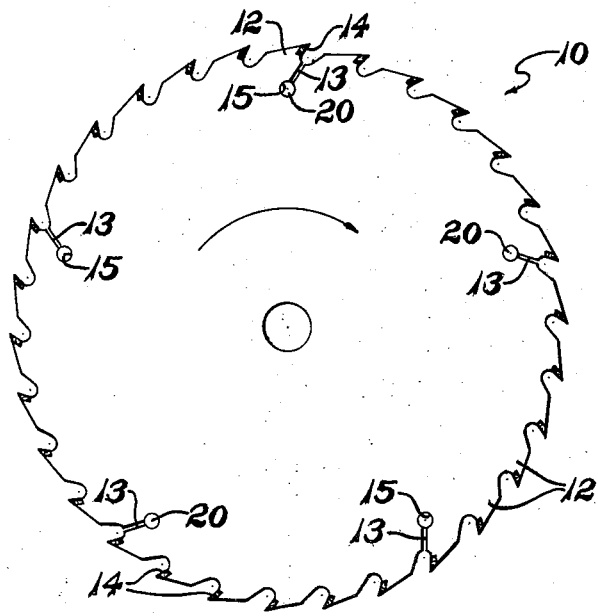
Figure 3:
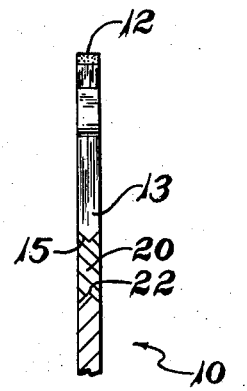
Figure 4:
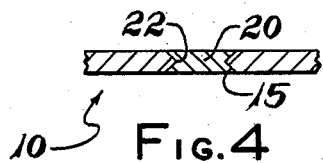
Figure 2:
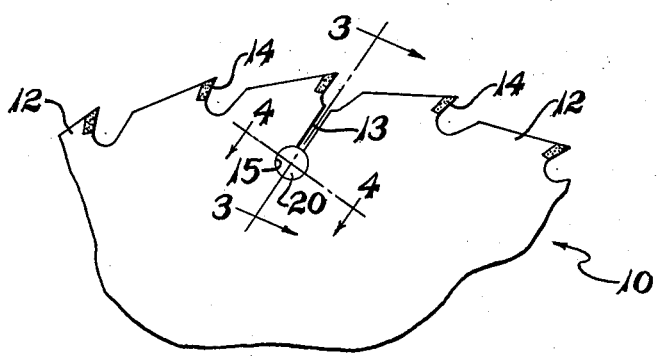

The invention will be further described with reference to the accompanying drawings in which:

FIG. 1 is a side view of one form of circular saw blade made according to and embodying this invention;

FIG. 2 is an enlarged fragmentary view of a peripheral portion of the blade of FIG. 1; and FIGS. 3 and 4 are sectional views taken along the lines 3—3 and 4—4, respectively, of FIG. 2.

The saw blade 10 chosen to illustrate the invention is a circular steel disc having tungsten carbide-tipped peripheral teeth 12. In making this saw blade, the teeth are usually formed in the periphery of a flat circular steel disc, and then the disc is appropriately heat treated, the teeth sharpened and ground, the carbide tips applied and finally the blade is "hammered," all in accordance with the traditional art of sawsmithing.

The periphery of blade 10 also includes a series of expansion slots 13 which extend through the blade from side to side. In the blade shown, the lengthwise extent of these slots is approximately parallel to the front faces 14 of the saw teeth. The slots are open at the periphery of the blade, and each extends to a hole 15 formed through the saw body relatively close to the periphery. The holes 15 with which these slots communicate are appreciably wider than the slots and all the holes are located an equal distance from the center of the blade. Moreover, the slots and their respective holes are spaced one from another around the periphery at equal distances. The expansion slots 13 permit the periphery of the saw to expand somewhat when the periphery is heated while in a kerf, to minimize warpage of the saw. The use of such slots for this purpose is, of course, known in the art.

The saw blade 10 differs from the blades previously known in the art in the respect that each hole 15 at the inner terminus of each slot in accordance with this invention, is entirely filled with a malleable metal insert 20 best shown in FIGURES 3 and 4. These inserts 20 are swaged into their respective holes 15 and are maintained in these holes by intense gripping pressure on them exerted by the sides of the holes. The opposite sides of the insert are flush with the sides of the saw blade. Preferably, to assist in retaining the inserts in holes 15, the sides of each hole 15 taper inwardly from each side of the saw to a narrow region 22 (FIG. 4) at about the medial plane of the blade.

The installation of the inserts 20 is the last major step in the manufacture of the saw. Prior to installing the inserts, the blade is made as explained in the foregoing discussion, and hammered so that the tension is equalized in the saw from the center or hub regions to the periphery. At the conclusion of this hammering process (without the inserts 20 in holes 15), the blade is entirely workable and operative for the cutting purposes for which it was designed, but normally it may be expected to emit a most nerve-wracking whine when rotated in air at rated speed.

By incorporating the inserts 20 into holes 15, however, the noise emitted by the blade is reduced to merely a slightly audible humming sound. We have compared the relative noise level of two identical saw blades operated at the same speed, one having inserts 20 as shown in FIG. 4 in its holes 15, and the other without such inserts. The blade without inserts emitted a noise measured at about 100 decibels whereas the noise level of the insert-equipped blade measured five decibels on the same calibration.

The inserts 20 are installed in the blade holes 15 in the form of cylindrical slugs (not shown) of a diameter which may be easily passed through the narrow center region of the holes 15. Then the inserts are swaged until their end faces are flush with the opposing sides of the blade, preferably by dies actuated by hydraulic pressure. The swaging operation exerts pressure on the slugs of extremely high intensity and therefore distorts the slug slightly into the mouth of the expansion slot opening into the hole. The intense swaging pressure on each slug apparently tends to spread or widen the adjoining slot slightly. Then when the swaging pressure is removed, the resilience of the saw blade tends to restore the slots to their original width and thus the slugs are maintained in their respective holes under appreciable constricting pressure for the life of the saw blade.

Preferably the inserts 20 are located relatively close to the periphery of the saw, being inset from the outermost tips of the teeth a distance of about 20% of the radius of the saw to said tips. The exact radial location of the inserts is not a critical factor in achieving the desired results, but the inserts should be appreciably closer to the teeth than to the hub or center of the saw.

We attribute the improved results to the presence of the inserts 20 under pressure in the holes 15. One effect of the hammering processes appears to be an equilization of internal stress in a radial and circumferential direction throughout the blade. The installation of the inserts under pressure after hammering seems to alter the internal stresses in the blade throughout radial extending narrow lobe-like sectors between the hub region and each insert. Accordingly alternate radial sector regions of the blade would tend to vibrate at different frequencies and dampen each other to reduce the noise level. The presence of the insert also appears to dampen such vibrations. For whatever the reason, however, the operating noise level of the blades is materially reduced by the inclusion of such inserts as described.

The inserts 20 are a malleable metal. Preferably they are a malleable non-ferrous metal and we specifically prefer to use copper. The inserts may be of aluminum, brass, bronze and similar commercial malleable metals including various copper and aluminum alloys, etc. The selection of the inserts will depend on the service intended for the saw, and the cleaning techniques used for the saw. Copper is desirable because it swages nicely.

The inserts 20 are set in circular holes to avoid sharp corners which would provide stress concentrations in the blade. We have found that saws with such inserts are remarkably free of cracks around the holes 15 after substantial periods of service. The inserts may be in the form of cylindrical slugs of about ¼ inch in diameter prior to swaging for saws up to about 24 inches in diameter. For larger diameter saws (up to about 48 inches) slugs may be in the order of $5/16$ inch in diameter. The exact size of the slug could vary appreciably up to the point where the structural strength of the saw becomes too weak.

We prefer to space the inserts equally one from another in the circumferential direction of the blade and to use an odd number of inserts. However, the tooth configuration of some special saws does not allow this always, and we have found that most significant noise reduction is achieved where unequally spaced inserts are used. The same is true in cases where an even number of inserts is used.

Variations in the structure described may be made within the scope of the appended claims.

I claim:

1. A circular metal saw blade having adjacent the toothed edge thereof a hole in which there is an insert of a metal softer than the metal of said blade extending through the blade in tight pressure engagement with the sides of said hole, and an open unobstructed expansion slot in the blade leading from said hole and said insert therein to an open end at said toothed edge.

2. A substantially flat circular metal saw blade with cutting elements at its peripheral edge, the blade having a narrow open slot opening at one end to said edge of the saw and leading to a hole through the saw blade adjacent said edge at the other end of the slot, and an insert of a metal softer than the metal of said blade filling said hole only, the slot being substantially free of said insert metal and otherwise unobstructed, and said insert being in tight pressure engagement with the sides of said hole.

3. A saw blade according to claim 2 in which the opposite ends of said insert are flush with the adjoining sides of said blade.

4. A saw blade according to claim 2 in which said hole is circular.

5. A saw blade according to claim 2 in which said hole tapers inwardly from each side of the blade to a narrower portion intermediate the sides of the blade, and said insert entirely filling and conforming to the shape of said hole.

6. A saw blade according to claim 2 in which said insert is located appreciably closer to the periphery than to the center of said saw blade.

7. A saw blade according to claim 2 in which there are a plurality of said insert-filled holes and corresponding slots spaced one from another around the periphery of said blade.

8. A saw blade according to claim 7 in which there are an odd number of said insert-filled holes and corresponding slots.

9. A saw blade according to claim 2 in which said blade is a steel disc and in which said insert is copper.

10. A circular cutting tool comprising a thin flat steel disc having cutting teeth on the periphery thereof, a series of holes through the disc from one side to the other all located substantially away from the disc center on a common radius and spaced arcuately one from the other, an expansion slot narrower than said holes and extending from each said hole and opening to the periphery of the disc, and a metal insert softer than the metal of said disc in each said hole and entirely filling its respective hole and which is in tight pressure engagement with the sides of said hole, said metal insert being located only in said hole, the slot being substantially free of said insert metal and otherwise unobstructed.

References Cited in the file of this patent

UNITED STATES PATENTS

| 635,509 | Rowe et al. | Oct. 24, 1899 |
| 1,181,529 | Hutton | May 2, 1916 |
| 1,712,034 | Fromm | May 7, 1929 |
| 1,723,843 | Chapin | Aug. 6, 1929 |
| 1,803,103 | Fee | Apr. 28, 1931 |
| 2,064,407 | Bird | Dec. 15, 1936 |
| 2,563,559 | Sneva | Aug. 7, 1951 |